United States Patent [19]

Newnan

[11] Patent Number: 5,217,108
[45] Date of Patent: Jun. 8, 1993

[54] AUGER PORTIONING DEVICE FOR A COFFEE BEAN GRINDER

[75] Inventor: Brian D. Newnan, Louisville, Ky.

[73] Assignee: Grindmaster Corporation, Louisville, Ky.

[21] Appl. No.: 816,749

[22] Filed: Jan. 2, 1992

[51] Int. Cl.⁵ .............................................. B65G 33/00
[52] U.S. Cl. ...................................... 198/670; 222/413
[58] Field of Search ................ 198/550.01, 550.1, 670, 198/671, 533, 659; 222/241, 413, 547, 564, 643; 239/592, 593, 650, 675

[56] References Cited

U.S. PATENT DOCUMENTS

| | | | |
|---|---|---|---|
| 2,753,089 | 7/1956 | Phillips | 222/413 X |
| 3,093,271 | 6/1963 | Douglas | 222/413 |
| 3,194,385 | 7/1965 | Barnese | 198/659 X |
| 3,228,561 | 1/1966 | Rosenberg | 222/643 X |
| 3,458,089 | 7/1969 | Maxson et al. | 222/413 X |
| 4,798,280 | 1/1989 | Hornhardt et al. | 198/670 X |
| 5,037,004 | 8/1991 | Katz et al. | 222/413 X |

FOREIGN PATENT DOCUMENTS

| | | | |
|---|---|---|---|
| 0011259 | 1/1988 | Japan | 198/670 |
| 1350086 | 11/1987 | U.S.S.R. | 198/670 |
| 1419961 | 8/1988 | U.S.S.R. | 198/671 |

Primary Examiner—Robert P. Olszewski
Assistant Examiner—James R. Bidwell
Attorney, Agent, or Firm—Vance A. Smith

[57] ABSTRACT

A coffee bean transport system for moving beans between a bean hopper and a bean operating mechanism has a transitional zone where the beans exit the hopper which serves to merge beans moved by an auger mechanism into a core flow of beans that has a constant density.

18 Claims, 5 Drawing Sheets

AUGER PORTIONING DEVICE FOR A COFFEE BEAN GRINDER

BACKGROUND OF THE INVENTION

Coffee grinders have long been used in the small restaurant industry to provide specified ground coffee amounts to a brewing apparatus. A typical prior art coffee grinder is provided, for example, with a single hopper which feeds directly into the inlet of the grinding mechanism. Each hopper employed in such applications generally holds a significant amount of beans, e.g., in the range of three to five pounds of beans, only a portion of which is ground in any particular grinding operation. The "portioning" of the beans is a critical operation to the ultimate successful brewing of the coffee. It is important that the portioning of the beans from one operation to another of the grinder remain close to a predetermined constant in order to preserve the consistency of the coffee ultimately brewed from the grounds. The ability of the portioning operation to provide a predetermined weight of coffee beans (a "throw") within accepted error limits consistently is frequently called "repeatability", a ratio of the standard deviation to the mean throw. To ensure good repeatability, various techniques have been employed, which generally involve either timer or volumetric controls or a combination of the two. Perhaps the most preferred is the use of a timer to control the grinding operation so that the grinder operates for a predetermined time period during each operation. Timer accuracy provides a repeatability of no greater than about 1%. The grinder itself will provide a repeatability of no greater than about 5%. It can be shown that the repeatability of the ground coffee portion made under these circumstances should vary no more than about 3 to 5%. Repeatability of coffee portion in this percent range has found general acceptance among users of such coffee grinders today.

With the advent of the dual hopper single grinder apparatus, it has now become necessary to control the repeatability of the coffee which egresses from a selected one of the two hoppers from operation to operation. In one prior art system, the coffee is volumetrically portioned by a hollow, rotating cylinder first filling with coffee beans from the selected hopper, then unloading the beans into the grinder inlet. A timer is set to ensure that the grinder grinds all of the coffee beans unloaded into it. The grinder generally is on a short time period longer that necessary to always ensure the complete grinding of the volume of beans received from the rotating cylinder. It has been found that the repeatability is generally in the range of 2 to 3%. The apparatus depends solely on the accuracy of bean delivery to the grinder as opposed to the timer.

Still another type of dual hopper single grinder mechanisms uses dual carriers each associated with a hopper for carrying the beans from the hopper to the single grinding unit. An example of this may be found in U.S. Pat. No. 4,955,510 to Newnan and assigned to the same assignee as the present invention. As described in the Newnan patent, each of the carriers also acts as a portioning device which are preset to accept certain predetermined volume of beans. This type of grinder mechanism does not depend upon the timer mechanism for repeatability accuracy as long as the grinder operation time cycle is sufficiently long, i.e., as great or greater than the longest time needed to grind the entire volume of beans delivered to it from the carrier. However, in order to change the amount of beans ground it would be necessary to change the available volume of the carrier and then one must ensure the time set of the grinder is sufficiently long to grind the delivered beans.

To provide greater flexibility, shutter mechanisms may be employed as valves to control the flow of the beans. Some of the earlier shutter valve arrangements used two shutters which were spaced apart to define a predetermined volume. The upper shutter would allow beans to flow into the space and then close. The second shutter would then open and the beans would be delivered to the grinder. Again the volume was preset by the choice of the distance between the shutters. Such mechanisms did provide high repeatability.

A refinement on the shutter mechanism is a dual shutter mechanism which combines the volumetric and timer controlled types together as disclosed in U.S. Pat. No. 4,789,106 to Weber assigned to the same assignee as the present invention and U.S. Pat. No. 4,971,259 to Nidiffer. The combination of both volumetric and timer controls allows greater choice and flexibility in operation. A timer, which is one shot operation, opens the shutter thus allowing the beans to fill the cavity in the grinder head below the shutter. The shutter then is closed. Grinding operation would then be initiated to grind the entire volume of beans which occupy the cavity. This volume is the minimum reliable volume since any volume less than the volume of the cavity can only be portioned by either reducing the time period for shutter operation or setting a shorter grind period which would not grind all the coffee beans given the grinder head. The former would create high repeatability errors and the latter would result in contamination of the coffee since the grinder serves two hoppers each of which would likely contain different types of coffee beans. In practice, however, the sliding valve arrangements as described above are generally used where the minimum reliable volume is exceeded by increasing the time the slide is left open.

The total volume of the coffee ground can be expressed in approximate terms by the following simple relationship:

$$y = kt + b$$

where b is the minimum volume, k is the volumetric rate at which the grinder operates, and t is the time required for grinding the total volume. In the situation in which the total volume is equal to the minimum volume, e.g., the volume occupied by about one and one half ounces of coffee beans, the shutter might be open for 2 seconds and the grinder could be operated for slightly less than 4 seconds (assuming a grind rate of 0.4 ounces per second). However, in practice the grinder would be operated for a much longer time period, e.g., ten seconds, to ensure absolutely that all of the beans were ground. This extended time period is over six seconds longer than required, but repeatability is accurate and can be shown to be about 3 to 4%.

When it is desired to have a larger volume to be round, for example, a throw of about three ounces, the shutter time can be extended and determined via the expression above to be about 4 seconds. In this situation the grinder is turned on simultaneously with the opening of the shutter and continues to grind for ten seconds after the shutter has been closed. The longer the shutter is left open, the greater the coffee portion is. As the "kx" portion of the equation becomes dominant, i.e. for kx>>b, the operation of the grinder apparatus becomes closer to a pure time controlled operation.

A problem of consistency occurs when the desired vol becomes less than the cavity of the grinder. When the shutter is operated rapidly providing too short an opening time for the beans to fill the grinder cavity, significant errors are possible. The varying size, surface structure and shape of the coffee beans all contribute to the flowability of the bean stream emanating from the hopper into the grinder. Dispensing errors up to 30 to 50% may result when such smaller volumes are required. Moreover, the addition of hardware to control the shutter speed at higher speed ranges increases the expense of the grinding system and the complexity thereof.

The above problem has become exacerbated as the consuming public has changed its taste preferences to finer grounds and darker roasted and flavored coffees. The weights of coffee used to brew a typical 12 cup decanter have been steadily declining since 1975 when the recommended portioning was from 2.75 to 3.0 ounces to 1990 where the proper portioning can be a throw as small as 0.75 ounces. Moreover, darker roasted coffees tend to have beans which are larger, increased surface oils, and are more friable. Flavored coffees are usually coffees of which the beans have been coated with flavorants such as chocolate, vanilla, sugar, cream and the like which lead to alterations in the flow patterns of the coffee beans when dispensed. These preference changes by the consuming public have made it much more difficult for existing bean dispensing apparatus to provide the required portioning consistency between grinding operations. For example, shutter mechanisms used to dispense a throw of beans of 1.5 ounces or less give rise to dramatic and undesirable increases in errors in repeatability, often at unacceptable levels approaching 30%.

Clearly, a more precise means of metering the coffee beans is needed such as provided by auger or screw conveyor mechanisms. One interesting patent is U.S. Pat. No. 3,228,561 issued Jan. 11, 1966 to Rosenburg illustrates two augers or screw conveyors being used with a dual hopper apparatus in which the material in the hoppers is selectively moved by the augers to a grinding mechanism. The augers provide a mechanism for more precise metering of the materials to the grinding operation and subsequent mixing. This use of augers is typical and employed to a large extent in the chemical industry where careful attention is being paid to the amounts of materials being transported and mixed.

Auger mechanisms for moving coffee grounds have been known for some time. One example is disclosed in U.S. Pat. No. 4,688,474 issued Aug. 25, 1987 to Siegfried Anderl in which a plurality of ground coffee containers communicate through respective augers to a coffee percolator. Still another U.S. Pat. No. 4,493,249 issued Jan. 15, 1985 to Stover discloses the movement of flaked or freeze dried coffee material to a bowl containing hot water for mixing and dissolving. Thus, it is clear that augers have found acceptance for use with coffee brewing mechanisms. In contrast, however, use of augers with coffee beans has been limited by the industry due to the problems experienced with handling of the beans. The size of coffee beans are orders of magnitude larger than ground coffee particles which give rise to significant metering problems when egress of beans into the core flow is disturbed. Additionally, the oils inherently present in coffee beans introduce problems not faced by existing auger conveyors used for moving coffee grounds.

Thus, it would be highly desirable to have a coffee bean movement mechanism which could provide the superior metering capability of an auger conveying mechanism without the serious handling drawbacks presently experienced.

SUMMARY OF THE INVENTION

A coffee bean transport system for moving beans between a bean hopper and bean operating mechanism has a housing which defines a bean hopper, a bean operating mechanism for operating on beans moved thereto from said hopper, and an auger transporting mechanism operatively connected at one end to an auger drive mechanism and having a distal other end extended to a position near said bean operating mechanism. The system also includes a transition means having a housing enclosing a portion of said auger transporting mechanism and said distal end thereof for merging bean agglomerations into the core flow of coffee beans being moved by said auger mechanism. The geometrical relationship between various parts of the housing and carefully observed relationships between the auger mechanism and average bean size minimizes bean jamming and stalling within the system and maintains essentially constant bean density within the core flow to a bean operating mechanism such as a grinder thereby providing consistently repeatability by weight of coffee beans to the grinder.

Other features and advantages will become apparent upon a reading of the following description taken in conjunction with the attached drawing and appended claims.

Figure 1:
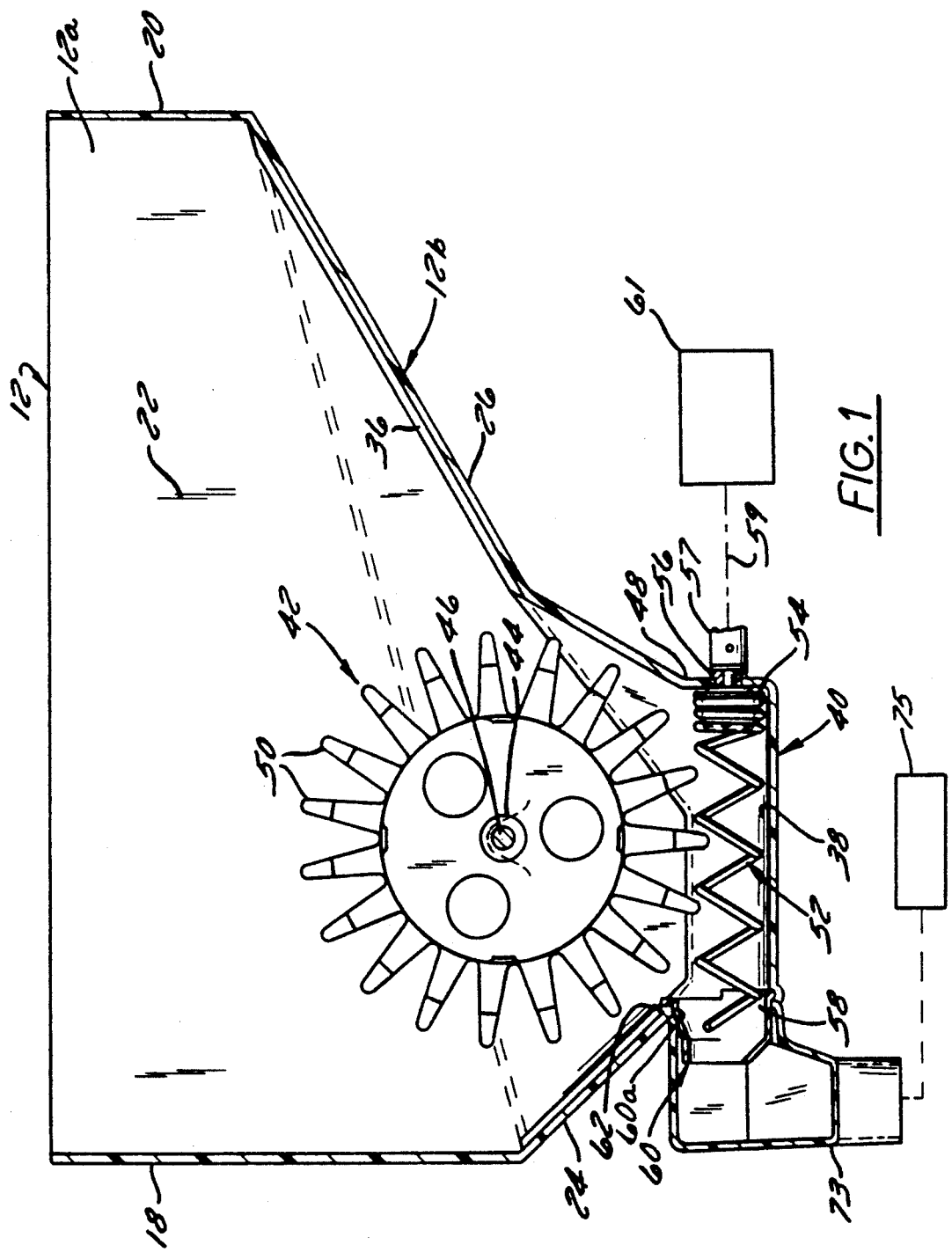
FIG. 1 is a side view of a auger portioning device constructed in accordance with the present invention.

Before describing in detail a preferred embodiment of the present invention in detail, it is to be understood that the invention is not limited in its application to the details of construction and the arrangement of the components set forth in the following description or illustrated in the drawing. The invention is capable of other embodiments and of being practiced or carried out in various ways. Also, it is to be understood that the phraseology and terminology employed herein is for the purpose of description and should not be regarded as limiting.

DETAILED DESCRIPTION OF THE PREFERRED EMBODIMENT

Figure 2:
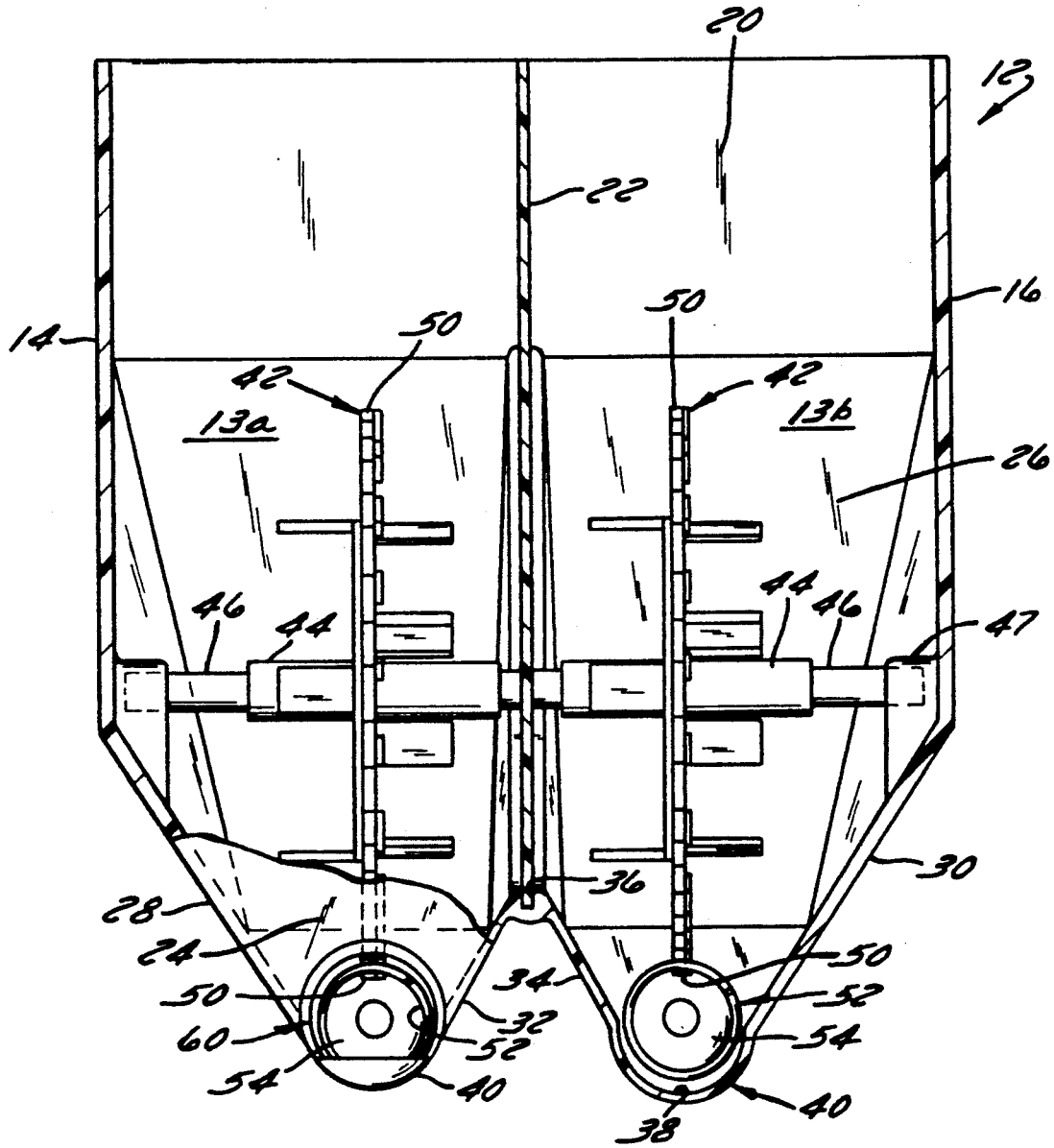
FIG. 2 is a front view of the auger portioning device of FIG. 1.
Figure 3:
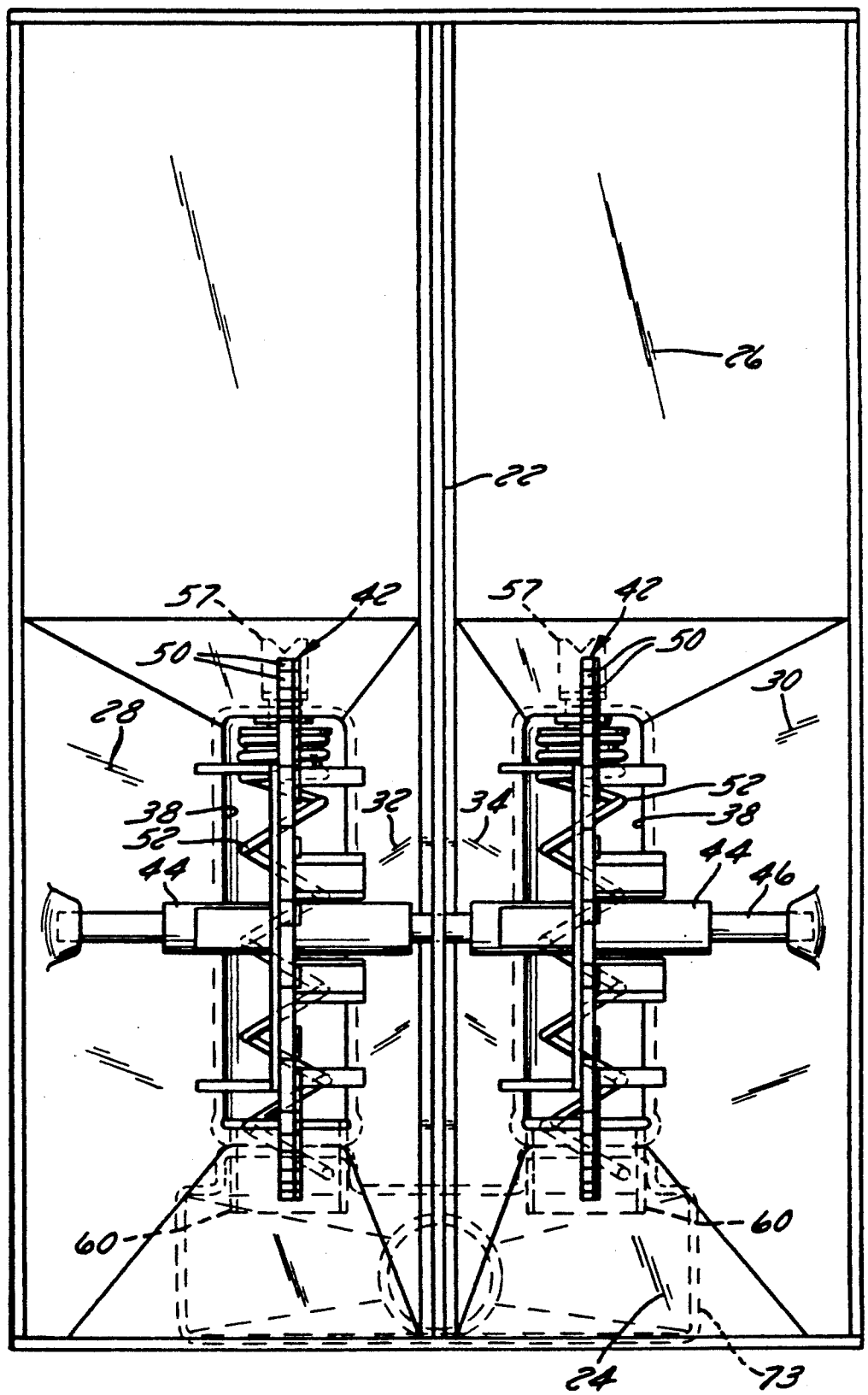
FIG. 3 is a top view of the auger portioning device of FIG. 1.

Reference is now made to FIGS. 1, 2 and 3 which illustrate various views of the bifurcated hopper assembly 12. As is clearly evident, particularly in FIG. 1, the assembly 12 has upper and lower sections 12a and 12b. Upper section 12a is defined by vertically disposed, parallel side walls 14 and 16 and vertically disposed, parallel front and back walls 18 and 20.

The lower section 12b of the assembly is funnel shaped and is formed by a front wall 24, a back wall 26, a pair of downwardly extending exterior sidewalls 28 and 30, and a pair of interior sidewalls 32 and 34. The interior side walls 32, 34 integral along the top edge thereof mutually form a groove 36 along the length of the top edge. A wall 22, extending across the assembly 12 between front and back walls 18 and 20 of the upper section 12a and front and back walls 24 and 26 of lower section 12b, registers at the lower end thereof in groove 36. Wall 22 thus effectively bifurcates the entire volume of the hopper assembly 12 into two separate hopper volumes 13a and 13b as best seen in FIG. 2.

In lower section 12b, the convergence of the walls in each hopper volume 13a and 13b defines a pair of openings 38 each of which communicates with a cylindrically shaped housing 40. Housing 40 may be made integral with the walls of section 12b as desired. The top edges of side walls 24, 26 and front and back walls 28, 30 also register with the lower edges of corresponding walls of the upper section 12a to complete and seal the bifurcated hopper assembly 12.

A pair of coffee bean agitator wheels 42 are positioned in each hopper volume 13a and 13b. Each wheel 42 is provided with a sleeve 44 adapted to receive an axle 46 which may be secured to a pair of flanges 47 mounted on the side walls of section 12b and partition wall 22. Agitator wheels 42 can freely rotate about axles 46. The teeth 50 of agitator wheels 42 extend partially through the openings 38 into the space defined by housings 40.

An auger element 52 is positioned in each housing 40. Each element 52 may take the form of a spring made from stainless steel wire having a diameter of about 0.125". The stainless steel must be an alloy which is resistant to or chemically inert with respect to the deleterious effects of coffee oils and the like such as, for example, stainless steel type 304. Alternatively, a chrome plated steel may also be employed. One end of each auger element 52 is secured to an axle member 54 seated for rotary motion within a bushing 56. Bushing 56 is positioned within an opening in end wall 48 of housing 40. A coupling member 57 attached to the end of axle member 54 is adapted to be operatively connected (as shown by dashed lines 59 in FIG. 1) to a motor 61. Since the auger elements 52 will not be operated simultaneously, a single motor can be used to drive the auger elements 52 through any well known system of gears and pinions. The other end of the auger element 52 extends through an opening 58 of housing 40 as shown by dashed lines in FIG. 4.

One important contribution of the present invention is to provide an effective transportation of the coffee beans from the assembly 12 to the grinding operation. To accomplish this, a "spout" member 60 specially configured for the transportation of the beans is fixed in place over the openings 58. To secure the spout members 60 in place about the opening 58 of housing 40, each housing 40 may be provided with a shoulder portion 62 along the upper edge of housing 40 defining the opening 58 and a groove 49 along the lower edge thereof. The spout 60 is provided with an extension 61 which slides behind the shoulder portion 62 upon insertion. At the same time, the lower edge of the spout 60 is flexed slightly inwardly until ridge 63 snaps locks into groove 49. Alternate techniques of attaching spout 60 may be used also including molding spout 60 integral with the hopper assembly 12 if desired.

Before proceeding further, it is informative for an understanding of the nature of applicant's invention to discuss certain observations and findings of applicant with respect to the use of the auger to convey coffee beans. In a typical screw conveyor, the auger member moves the particulate material received from a hopper into a chamber toward a chute for dispensing as desired, for example, for mixing or further mechanical operation on the material itself such as in a grinding operation. At the entrance to the chamber, the material tends to pile up above the auger member before being fed into the main flow of the material being moved. In applications where the particulate material is fine or where precise metering of the material to its final destination is not required, the problem of the piling of the material above the auger does not take on significance. However, where the particulate material has a size which is large compared to the auger pitch and precise metering is essential, the typical auger conveyor does not function in a satisfactory manner. In the conveyance of coffee beans using auger conveyors as taught by the prior art, problems frequently occur due to the jamming of beans between the flights of the auger and the wall immediately above the passageway. Moreover, coffee beans because of their natural oils tend to stick together and form "agglomerations" which exacerbate the jamming. Unless a powerful motor, thus more expensive and larger, is used to break up the agglomerations, the system tends to stall while the agglomerations are separated into individual beans or the bean jammed between auger flight and wall is shattered. Such stalling results in undesired power surges to the motor. The stalling and the premature bean breakage is also instrumental in a change of the metering pattern of the coffee beans to the grinder. That is, the density of the "core bean flow" within the auger itself varies, making consistent repeatability a problem. For purposes of this description, "core bean flow" is defined as the flow of the beans within the diameter of the auger itself which is caused by the rotation of the auger.

Applicant, however, has determined that by choosing the proper geometrical arrangement of the passage or chamber leading from the hopper and selecting proper auger dimensions with respect to bean dimensions, the problems posed by prior art auger technology can be overcome allowing use of the auger's capability for precise metering of coffee beans in the amounts desired by today's consumers. The density of coffee beans within the core bean flow can be made essential constant through construction of an auger mechanism in accordance with applicants teachings. The problems caused by stalling of the auger action due to jamming of beans may also be eliminated providing further superior results.

Figure 4:
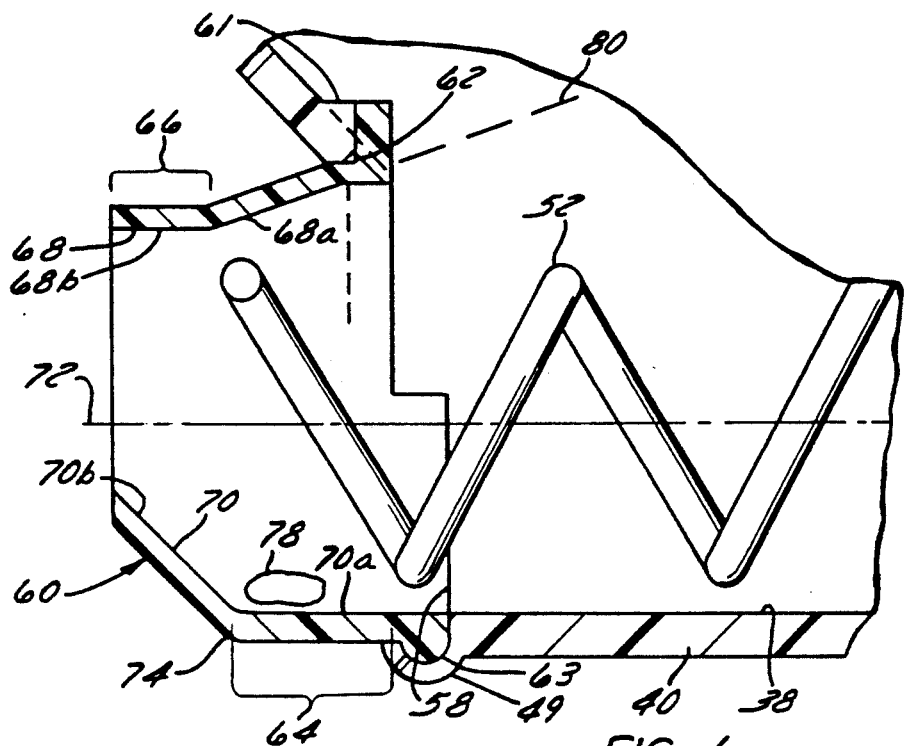
FIG. 4 is an enlarged view of the transitional zone and related elements taken from FIG. 1.

As perhaps as best seen in the enlarged view of FIG. 4, the internal configuration of spout member 60 encompasses two zones. A first zone, the "transition zone", is denoted by numeral 64 while the second zone, the "exit zone" is denoted by numeral 66. Spout member 60 is provided with an upper surface region 68 and a lower surface region 70 which, depending upon the location of the two surface regions within the zones, have altered configurations. Within transition zone 64, the upper surface region 68a is tapered toward the lower surface region 70a. Lower surface region 70a within transitional zone 64 may be essentially a surface of a right cylinder about a longitudinal axis denoted by the dashed line 72 and merges into the tapering upper surface region 68a. However, the structure of the lower surface region does not take on the significance of the upper surface region and, alternatively, could be a fl-at surface which intersects with a pair of perpendicular walls which then merge into the upper surface region.

At juncture 74, the boundary between zones 64 and 66, the upper surface region becomes essentially a surface 68b of a right cylinder about longitudinal axis 72. Alternatively, the upper surface region 68b could be a flat surface intersecting with perpendicular side walls. The lower surface region 70b within the exit 66 zone, however, may be provided in the form of an upturned lip to prevent beans from being vibrated into the grinder when, for example, the auger of the other hopper is being used.

Figure 5:
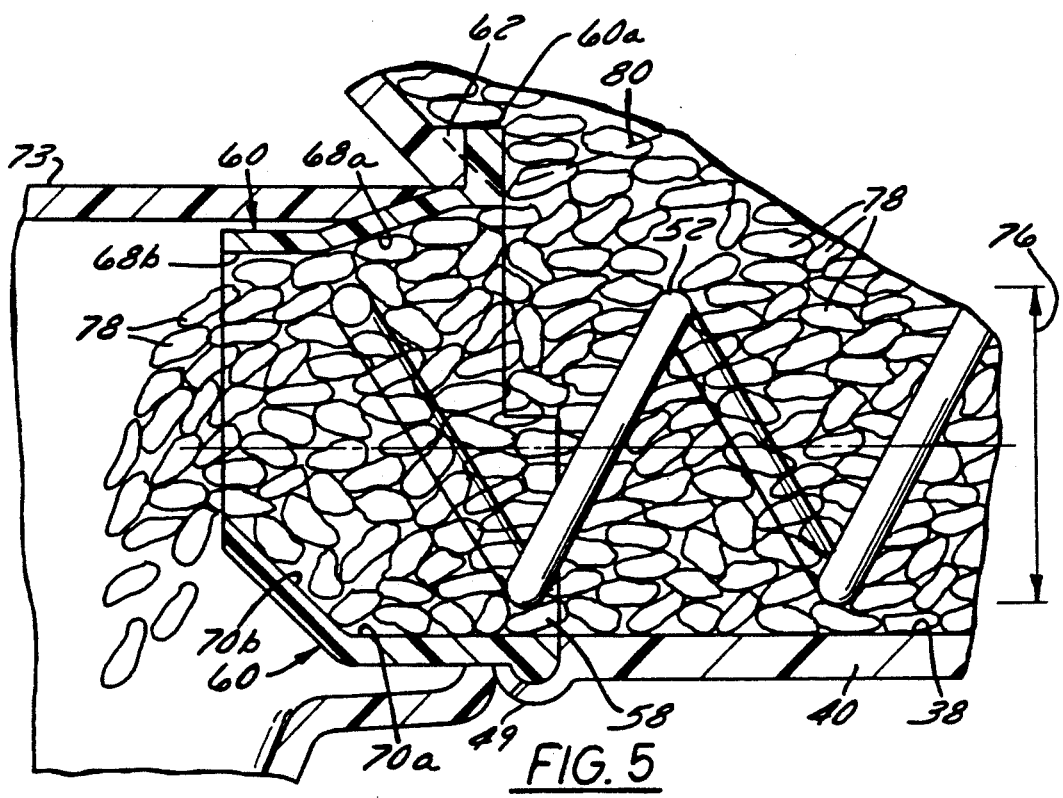
FIG. 5 is a enlarged view of the transitional zone and related elements with representations of coffee beans added.

In operation, motor 61 operatively connected to coupling 57 is energized causing the auger element 52 to rotate. As is best seen in FIG. 1, the ends of teeth 50 of agitator wheels 42 are intermeshed with the flights of auger elements 52. Thus, the rotation of the auger element 52 causes the agitator wheels to rotate, breaking up some of the agglomerations of the beans 78. The flights of the auger element 52 drive beans located within the core flow 76, best illustrated by FIG. 5, forward toward opening 58 in the housing 40. Applicant has noted that, to ensure the best results avoiding the jamming of coffee beans between flights, it is important to observe a proper relationship between pitch of the auger flights and the "average bean diameter". Because coffee beans have shapes which vary and often approximate the shape of an oval, the mean diameter of a coffee is the statistical mean of the diameter measured across the bean. Optimum results occur where the pitch diameter is at least two, preferably three, times greater than the mean diameter of the beans being conveyed. Thus, by way of example only, for average bean diameters of about 0.375", a pitch diameter of 1.125" is preferred. Of course, various varieties of coffee beans have different bean diameters but the preferred pitch suffices for most of the commonly used varieties. It is also preferred to utilize auger elements of the wire type such as previously described above. Solid core augers tend to break more beans, requiring a larger and more powerful motor to minimize undesirable stalling.

As the beans exit from housing 40, the problem of jamming and stalling is minimized due to the observance of another important geometrical relationship, a proper "taper angle". For purposes of this description, the "taper angle" is defined as the angle between a line measured along the apex of the upper surface region 68a (as shown by dashed line 80) and the longitudinal axis 72. The taper angle can be considered as a measure of convergence into the core flow of the coffee beans which are piled above and immediately juxtaposed to the auger device 52. The upper surface region of the 68a of the housing 40 is provided with a taper angle of about 12° to 30°. Using a taper angle within the prescribed range minimizes the occurrence of jamming between the wall above the opening and the flights of the auger mechanism and to promote movement of beans into the core flow without causing larger than desired variations in the bean density. Applicant has found that taper angles of greater than about 30° are not sufficient to prevent the accumulation of agglomerations and jammed beans between the housing wall and the auger flights. It has been additionally noted by applicant that taper angles of less than about 15° require much longer transitional lengths than are practical.

With respect to transitional zones, it has been observed that the length of the transitional zone should be an appreciable percentage of the length of the auger element itself and it is highly desirable that the transitional zone encompass at least fifty percent of the auger pitch. For example the auger element may be about 4.25" in length. If the auger pitch is 1.125", then the length of the transitional zone must be at least 0.562". However, applicant has additionally noted that the length of the transitional zone must be at least twice that of the average bean diameter. Thus for bean diameters of 0.375", the length of the zone must be about at least 0.75". By observation applicant has noted that transitional zone should be between about 15% and 40% of the auger length with a range of 18% to 30% being preferred. In most situations the average diameter of the coffee beans determines the minimum length of the transitional zone.

Once the beans have transve the transitional zone, the beans enter the exit zone 66 where the lip formed by the lower surface region 70b serves to prevent the beans from entering into the grinder due to the vibrations of the system during operation. To further provide for protection against the scattering of bean particles and the like, the device may further be provided with a protective hood such as funnel 73 as seen in FIG. 1.

To further illustrate and by way of example only, applicant, using an auger portioning device constructed in accordance with the present invention, has obtained repeatability errors less than about 1.7% when delivering throws of coffee beans of about 1.50 ounces without the jamming and stalling frequently present when using other auger apparatus. The auger device employed operated on coffee beans having a mean diameter of about 0.34". The auger element had a pitch of about 1" and a length of 3.5" from its fixed end to the free distal end. The taper angle within the transition zone was about 20°. About one half of a pitch of the auger was within the transition zone which was about 0.5" in length. The auger was rotated at about 150 rpm by a remote motor, preferably of the synchronous type, in order to deliver coffee beans at a rate of about 0.35 ounces a second to the grinder. The auger rotated for slightly less than about 5 seconds in order to deliver the desired 1.5 ounce throw. The grinder itself should continue to run from a predetermined time period after this in order to ensure that all the beans delivered to it were completely ground. This is particularly important when the dual hopper carries two different types of coffee such as caffeinated and decaffeinated coffee. The amount of beans moved during any single operation depends upon a number of parameters. However, assuming the beans of essentially constant mean diameter and the pitch of the auger element is not changed, the throw can be altered by increasing or decreasing the time the auger element is operated or, alternatively, increasing or decreasing the rpm of the auger element and maintaining the time of operation the same.

Figure 6:
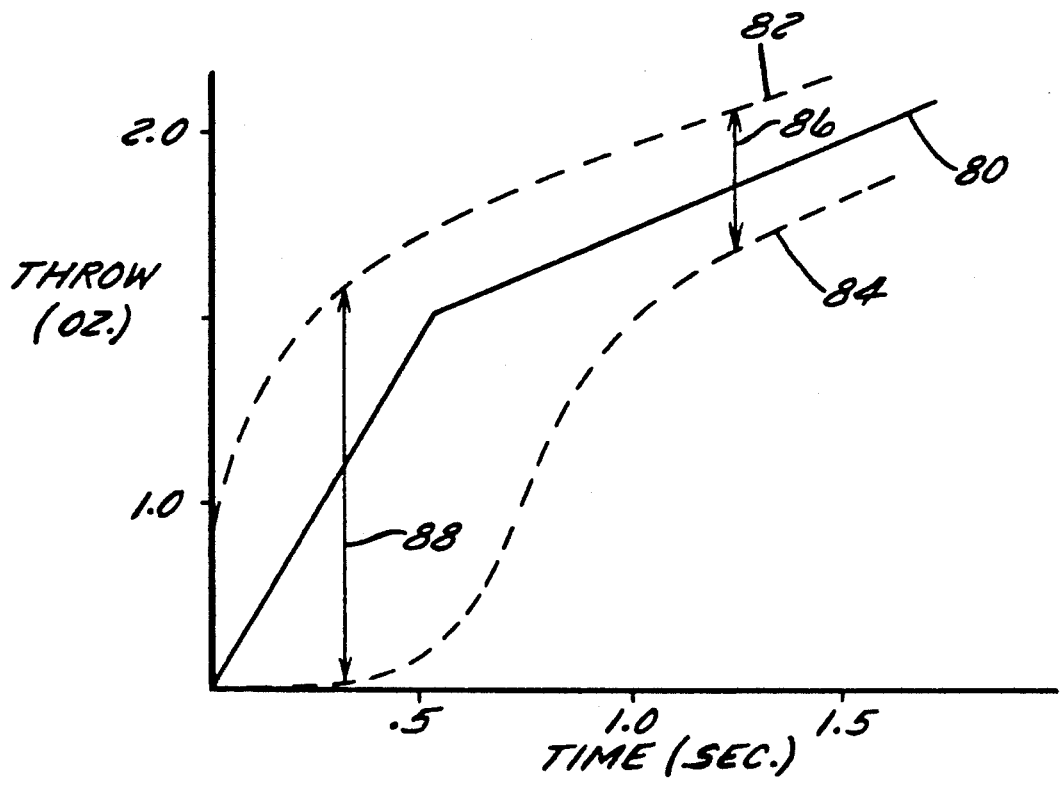
FIG. 6 is a graph of the repeatability of bean throws by a typical sliding valve arrangement.

Solid line 81 of FIG. 6 illustrates graphically the relationship between throw in ounces and the operational time of a typical slide operation needed to provide the throw. Dotted lines 82 and 84 represent respectively, the upper and lower limits of errors from the mean throw. From the length of line 88 it may be seen that the error in the throw is significantly greater for small throws than at the larger throws as indicated by line 86. Much of this error may be attributed to the finite amount of time it takes for the beans to fall under gravity into the grinder cavity from the at rest position within the hopper. The natural stickiness of the beans also contributes to this large error.

Figure 7:
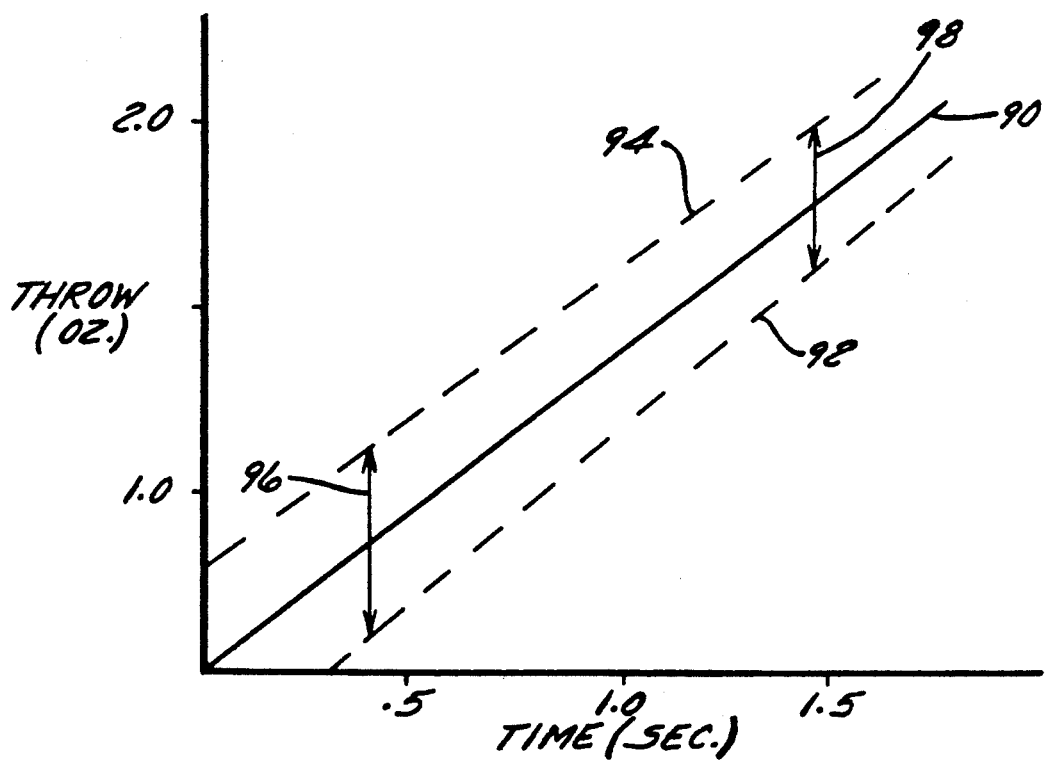
FIG. 7 is a graph of the repeatability of bean throws by an auger portioning device made in accordance with the present invention.

In contrast, FIG. 7, representing graphically the error range of an auger portioning device constructed in accordance with the present invention, clearly demonstrates that such a device provides small repeatability errors in the small throw region. Solid line 90 represents the relationship of mean throw to the time of operation of the auger while lines 92 and 94, respectively, are the upper and lower limits of error. It is clear from a comparison of error line 96 to error line 98 that small errors in repeatability are consistent throughout the entire practical range of throws when using such an auger portioning device.

Conventional auger arrangements, not having the structure disclosed herein by applicant, frequently hesitated due to jamming and agglomerations unless larger motors were used. Thus, from the above it can be seen that auger portioning devices constructed in accordance with the present invention provides the superior metering results associated with auger devices yet avoided the problems that often occur when using augers with difficult-to-move materials such as coffee beans.

I claim:

1. A coffee bean transport system for moving beans between a bean hopper and bean operating mechanism comprising
   a housing defining a bean hopper for storing coffee beans;
   a bean operating mechanism for operating on beans moved thereto from said hopper;
   an auger transporting mechanism positioned beneath said bean hopper with substantially the entire length of said auger mechanism in communication with said hopper, said auger transporting mechanism operatively connected at one end to an auger drive mechanism and having a distal other end extended to a position near said bean operating mechanism;
   transition means including a housing directly connected to and communicating with said hopper and having a tapered upper surface region juxtaposed to said hopper that converges toward the longitudinal axis of said auger mechanism in a direction away from said housing, said housing enclosing a portion of said auger transporting mechanism and said distal end thereof, said transition means for merging bean agglomerations into a core bean flow being moved by said auger mechanism and maintaining essentially constant bean density within said core flow to said bean operating mechanism.

2. The system of claim 1 in which said housing defines a pair of hoppers; a pair of auger transporting mechanisms each of which respectively is disposed substantially below an associated hopper; and a pair of transition means each of which is associated with a respective auger transporter mechanism.

3. The system of claim 1 in which said auger transition housing has a bottom and side walls substantially parallel to the longitudinal axis of said auger mechanism.

4. The system of claim 3 in which said upper region region has a taper angle relative to said auger mechanism longitudinal axis of between about 12° to 30°.

5. The system of claim 4 in which said taper angle is about 15°.

6. The system of claim 4 in which about one half pitch of said auger mechanism is within said auger transition housing.

7. The system of claim 6 including a funnel connected to the auger transition housing and extending to said bean operating mechanism.

8. The system of claim 7 in which said transition housing has an upward slanting lip connected to said bottom wall thereof, said lip together with said side walls and top wall defining an opening of said transition housing into said funnel thereby minimizing beans from falling into said funnel due to vibrations in said system.

9. The system of claim 1 including an agitator member disposed in said bean hopper operatively connected to said auger transporting mechanism for breaking agglomerations of coffee beans piled above said auger transporting mechanism.

10. A coffee bean portioning device for metering a predetermined amount of coffee beans from a supply hopper to a grinding mechanism including
    a housing positioned below said hopper;
    an auger element disposed in said housing for rotary motion and extending essentially the length of said housing, one end of said auger element operatively connected to a means for rotating said auger element and the other end of said element extending through an opening in said housing into a transitional housing;
    said auger element having a pitch greater than about twice the mean diameter of the coffee beans metered by said device and extending into said translational housing a distance equal to about one-half pitch of the auger element;
    said translational housing having a first portion of a lower surface region which is substantially parallel to longitudinal axis of said auger element and a first portion of an upper surface region which converges toward said longitudinal axis, said first portion of said upper surface region forming an angle defined by a line drawn along the apex of said first portion of the upper surface region and the longitudinal axis said auger of between about 15° and 30°.

11. The portioning device of claim 10 in which said auger pitch is greater than about three times the mean diameter of the coffee beans metered by said device.

12. The portioning device of claim 11 in which said auger element has the shape of a coiled spring and is made from a material which is chemically neutral with respect to the coffee beans.

13. The portioning device of claim 12 in which said device has two hoppers and a pair of associated housings each housing an auger element.

14. The portioning device of claim 11 in which said coiled spring is made of a material selected from the group consisting of stainless steel and chromium plated steel.

15. A method of portioning coffee beans into a predetermined throw and transporting the throw to a grinder while minimizing errors in repeatability comprising the steps of
    (a) storing said beans in a hopper;
    (b) placing an auger device below and in communication with said hopper over substantially all of the length of said auger device with the distal end of the auger device extending into a translational housing;

(c) rotating said auger device at a predetermined speed and for a predetermined time period thereby causing said beans to move from beneath said hopper in a direction toward said translational housing; and (d) merging said coffee beans juxtaposed and piled above said auger device within said hopper directly into a flow of beans moving along and about the central axis of said auger device within said translational housing at an angle of about 15° to 30° with respect to the longitudinal axis.

16. The method of claim 15 in which the merging of said beans occurs within a distance measured along the longitudinal axis not greater than about one half pitch of the auger device.

17. The method of claim 16 in which the pitch of the auger is greater than about twice that of the mean diameter of the coffee beans.

18. The method of claim 15 including the step of continuously agitating the coffee beans stored in said hopper above said auger element.

* * * * *